(12) United States Patent
Haelion

(10) Patent No.: US 9,794,277 B2
(45) Date of Patent: Oct. 17, 2017

(54) MONITORING TRAFFIC IN A COMPUTER NETWORK

(71) Applicant: Cyber 2.0 (2015) LTD, Yavne (IL)

(72) Inventor: Erez Kaplan Haelion, Rehovot (IL)

(73) Assignee: CYBER 2.0 (2015) LTD, Yavne (IL)

(*) Notice: Subject to any disclaimer, the term of this patent is extended or adjusted under 35 U.S.C. 154(b) by 0 days.

(21) Appl. No.: 15/390,755

(22) Filed: Dec. 27, 2016

(65) Prior Publication Data

US 2017/0195348 A1  Jul. 6, 2017

Related U.S. Application Data

(60) Provisional application No. 62/273,530, filed on Dec. 31, 2015.

(51) Int. Cl.
*G06F 11/00* (2006.01)
*H04L 29/06* (2006.01)
(Continued)

(52) U.S. Cl.
CPC .......... *H04L 63/1416* (2013.01); *G06F 21/44* (2013.01); *H04L 63/1408* (2013.01);
(Continued)

(58) Field of Classification Search
CPC . H04L 43/00; H04L 41/0604; H04L 41/0631; H04L 41/082; H04L 41/0866;
(Continued)

(56) References Cited

U.S. PATENT DOCUMENTS 5,892,903 A  4/1999  Klause
5,903,721 A  5/1999  Sixtus
(Continued)

FOREIGN PATENT DOCUMENTS

JP  2004112018 A  4/2004
WO  2015051185 A1  4/2015

OTHER PUBLICATIONS

The Case for Ubiquitous Transport-Level Encryption. In USENIX Security Symposium (pp. 403-418).(Retrieved form the Internet). Retrieved from:<http://static.usenix.org/legacy/events/sec10/tech/full_papers/Bittau.pdf> Bittau, A. et al. Aug. 31, 2010 (Aug. 31, 2010).

*Primary Examiner* — Gary Gracia
(74) *Attorney, Agent, or Firm* — Koffsky Schwalb LLC; Mark I. Koffsky

(57) ABSTRACT

A computer-implemented method, computerized apparatus and computer program product for monitoring traffic in a computer network. The computer network comprises a plurality of devices configured to apply a transformation function on a target port identifier of a requested transmission by an application program executing thereon and direct the transmission to a different target port per the scrambled identifier thereby obtained. The transformation function depends on at least one parameter shared among the plurality of devices and applying thereof is conditioned on the application program requesting transmission being listed in a list of authorized application programs. Attempts to access invalid ports as defined by the transformation function are identified and an action for mitigating a security threat ascribed thereto is provided.

20 Claims, 5 Drawing Sheets

(51) Int. Cl.
*H04L 29/08* (2006.01)
*G06F 21/44* (2013.01)
*G06F 12/14* (2006.01)

(52) U.S. Cl.
CPC ........ *H04L 63/1441* (2013.01); *H04L 67/146* (2013.01); *H04L 67/24* (2013.01)

(58) Field of Classification Search
CPC . H04L 63/02; H04L 63/0227; H04L 63/0236; H04L 63/0807; H04L 63/1408; H04L 63/1425; H04L 63/1433; H04L 63/1466; H04L 63/162; G06F 21/577
See application file for complete search history.

(56) References Cited

U.S. PATENT DOCUMENTS

| | | | |
|---|---|---|---|
| 6,549,538 B1 | 4/2003 | Beck | |
| 8,751,650 B2 | 6/2014 | Mittal | |
| 2003/0216143 A1* | 11/2003 | Roese | G01S 5/02 455/456.1 |
| 2005/0132060 A1* | 6/2005 | Mo | H04L 51/12 709/227 |
| 2005/0182968 A1* | 8/2005 | Izatt | H04L 63/02 726/5 |
| 2005/0220017 A1 | 10/2005 | Brand | |
| 2006/0005227 A1 | 1/2006 | Samuelsson | |
| 2007/0070996 A1* | 3/2007 | Oran | H04L 67/06 370/389 |
| 2008/0276297 A1 | 11/2008 | Shay | |
| 2010/0046378 A1 | 2/2010 | Knapp | |
| 2010/0154059 A1 | 6/2010 | McNamee | |
| 2010/0235632 A1* | 9/2010 | Iyengar | H04L 9/3213 713/166 |
| 2011/0026529 A1* | 2/2011 | Majumdar | H04L 61/2015 370/393 |
| 2011/0122880 A1 | 5/2011 | Saito | |
| 2011/0246630 A1 | 10/2011 | Deutsch | |
| 2012/0331154 A1* | 12/2012 | Sunderrajan | H04L 67/146 709/227 |
| 2013/0058341 A1 | 3/2013 | Fulton | |
| 2014/0178074 A1* | 6/2014 | Xu | H04Q 11/0067 398/66 |
| 2014/0281546 A1* | 9/2014 | Doyle | H04L 9/0838 713/171 |

\* cited by examiner

MONITORING TRAFFIC IN A COMPUTER NETWORK

CROSS-REFERENCE TO RELATED APPLICATION

This application claims the benefit of U.S. Provisional Application No. 62/273,530 filed Dec. 31, 2015, entitled "MONITORING TRAFFIC IN A COMPUTER NETWORK", which is hereby incorporated by reference in its entirety without giving rise to disavowment.

TECHNICAL FIELD

The present disclosure relates to computer network communication in general, and to monitoring of traffic in a computer network, in particular.

BACKGROUND

Computer networks are prevalent among many enterprises and organizations. Typically, a network environment comprises a plurality of computerized devices interconnected to one another and sharing resources, such as, for example, through common access to one or more servers connected to the network. In many cases, some or even all of the devices in the network environment are simultaneously connected also to one or more external networks, such as the World Wide Web. As a result, any of the devices in the internal network environment are made much more susceptible to various security threats and attacks, in particular the proliferation of self-propagating malicious codes, also commonly known as "viruses" or "worms". Once a device in the network becomes compromised, the infection can spread quickly to the remaining devices, causing irreparable harm.

BRIEF SUMMARY

One exemplary embodiment of the disclosed subject matter is a computer-implemented method performed in a computer network environment comprising a plurality of devices, each of which being configured for applying a transformation function on an identifier of a target port for network communication indicated in a transmission request of an application program executing thereon, whereby a scrambled version of the identifier is obtained, the plurality of devices being further configured for directing the transmission to be received via a different target port identified by the scrambled version of the identifier, the method comprising: identifying an invalid port access attempt by a first transmission directed at a first port of a first computerized apparatus comprised in the plurality of devices; and, in response to said identifying, providing for an action to be performed whereby a security threat ascribed to the invalid port access attempt is mitigated; wherein said identifying the invalid port access comprises checking whether a first identifier identifying the first port is obtainable from applying the transformation function on a second identifier of a second port via which receipt is designated by a transmission request of an application program executing on a second computerized apparatus comprised in the plurality of devices; wherein the transformation function depends on at least one parameter shared among the plurality of devices, wherein the step of applying the transformation function by a device of the plurality of devices is conditioned on the application program requesting transmission being listed in a list of authorized application programs provided to the device.

Another exemplary embodiment of the disclosed subject matter is a computerized apparatus having a processor, the computerized apparatus being in communication with a computer network environment comprising a plurality of devices, each of which being configured for applying a transformation function on an identifier of a target port for network communication indicated in a transmission request of an application program executing thereon, whereby a scrambled version of the identifier is obtained, the plurality of devices being further configured for directing the transmission to be received via a different target port identified by the scrambled version of the identifier, the processor being adapted to perform the steps of: identifying an invalid port access attempt by a first transmission directed at a first port of a first computerized apparatus comprised in the plurality of devices; and, in response to said identifying, providing for an action to be performed whereby a security threat ascribed to the invalid port access attempt is mitigated; wherein said identifying the invalid port access comprises checking whether a first identifier identifying the first port is obtainable from applying the transformation function on a second identifier of a second port via which receipt is designated by a transmission request of an application program executing on a second computerized apparatus comprised in the plurality of devices; wherein the transformation function depends on at least one parameter shared among the plurality of devices, wherein the step of applying the transformation function by a device of the plurality of devices is conditioned on the application program requesting transmission being listed in a list of authorized application programs provided to the device.

Yet another exemplary embodiment of the disclosed subject matter is a computer program product comprising a computer readable storage medium retaining program instructions, which program instructions when read by a processor, cause the processor to perform a method carried out in a computer network environment comprising a plurality of devices, each of which being configured for applying a transformation function on an identifier of a target port for network communication indicated in a transmission request of an application program executing thereon, whereby a scrambled version of the identifier is obtained, the plurality of devices being further configured for directing the transmission to be received via a different target port identified by the scrambled version of the identifier, the method comprising: identifying an invalid port access attempt by a first transmission directed at a first port of a first computerized apparatus comprised in the plurality of devices; and, in response to said identifying, providing for an action to be performed whereby a security threat ascribed to the invalid port access attempt is mitigated; wherein said identifying the invalid port access comprises checking whether a first identifier identifying the first port is obtainable from applying the transformation function on a second identifier of a second port via which receipt is designated by a transmission request of an application program executing on a second computerized apparatus comprised in the plurality of devices; wherein the transformation function depends on at least one parameter shared among the plurality of devices, wherein the step of applying the transformation function by a device of the plurality of devices is conditioned on the application program requesting transmission being listed in a list of authorized application programs provided to the device.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
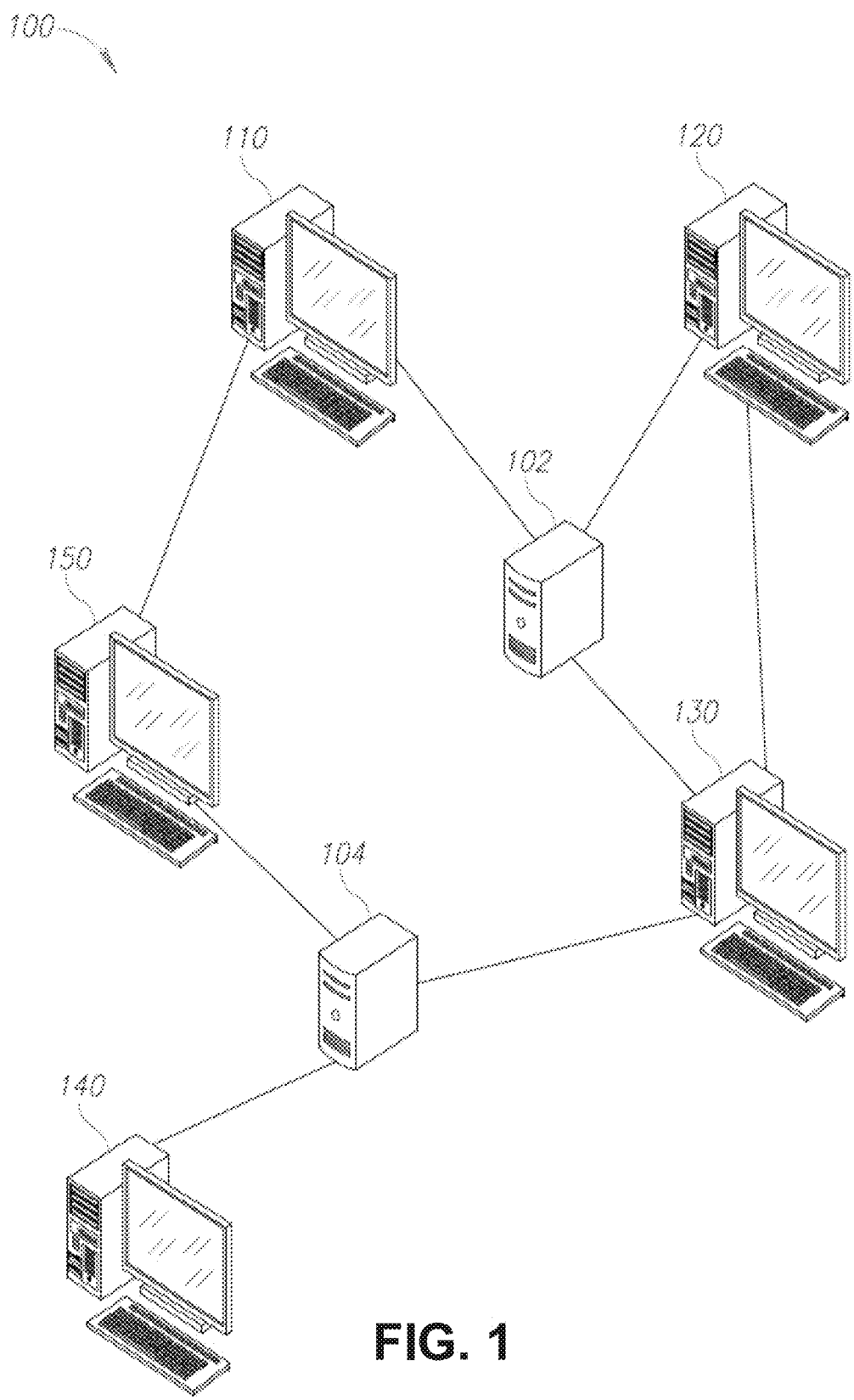
FIG. 1 shows a computer network in which the disclosed subject matter is used, in accordance with some exemplary embodiments of the subject matter.

One technical problem dealt with by the disclosed subject matter is to provide for secure communication in a computer network.

Another technical problem dealt with by the disclosed subject matter is to prevent spreading of malicious code within a computer network.

Yet another technical problem is to detect malicious activity within a computer network.

A "port" is a logical construct associated with a service or process residing on a computing platform and serves as an endpoint for different types of network communication. In some exemplary embodiments, a port is identified for each host address and communication protocol by a 16-bit number, thus a port number ranges from 0 to 65535. Generally, port numbers appear in network packets and map to specific processes or resources on the destination device that can handle or are expecting those packets. Some resources are preconfigured to listen to only certain predefined port numbers and ignore traffic associated with other ports. Typical network protocols that heavily rely on port numbers to map to resources include Transmission Control Protocol (TCP) and User Datagram Protocol (UDP). Some port numbers or port number ranges may be reserved for standard services, such as the "well-known ports" ranging from 0 to 1023 used by TCP and UDP. For example, services running the Hypertext Transfer Protocol (HTTP) protocol typically listen on port 80.

One technical solution is to selectively scramble port numbers towards which outgoing communications are directed at the transmitting end and descramble port numbers at which incoming communications are received. The scrambling is performed only for port numbers associated with approved application programs. The scrambling and descrambling are performed using one or more secret parameters shared among the network devices. The one or more secret parameters preferably include a time-varying component to decrease likelihood of an attacker "guessing" the target port number by port scanning.

In some exemplary embodiments, a server may monitor traffic within the network to detect traffic for which ports are not scrambled. Such traffic may be generated by software components that are not authorized and are potentially malicious. The server may monitor such traffic, analyze it and determine whether the activity is malicious or not.

One technical effect of utilizing the disclosed subject matter is to allow detection of attacks or outbreaks by identifying access attempts at regular port numbers. Furthermore, attempts to access ports that are not a scrambled version of any useful ports may also be indicative of potential unauthorized activity as authorized activity is constrained to be directed solely at scrambled ports.

Another technical effect is to prevent outspread of malicious activity that relies on human engineering. Even in case a human user is manipulated to allow access to a malicious user or code (e.g., pressing a harmful link or executing a malware sent via e-mail), malicious activity is likely to be contained in the infected device and not be spread to other devices.

Referring now to FIG. 1 showing a computer network in which the disclosed subject matter is used, in accordance with some exemplary embodiments of the subject matter.

In some exemplary embodiments, a Computer Network 100 may comprise a plurality of computing devices, such as Devices 110, 120, 130, 140 and 150. Computer Network 100 may comprise one or more servers, such as Servers 102 and 104. Devices 110 to 150 may be interconnected to one another, either by common access to one of Servers 102 and 104 or directly, such as through using a network switch, a hub, or the like. For example, Devices 110, 120 and 130 are connected to Server 102, while Devices 140 and 150, as well as Device 130 are connected to Server 104. In addition, Device 110 is directly connected to Device 150 and Device 120 is directly connected to Device 130.

In some exemplary embodiments, Computer Network 100 may be an intranet network of an organization. Computer Network 100 may be connected to an external network, such as the Internet (not shown). In some cases, Computer Network 100 is connected to the external network by a router, switch, server or the like, which may or may not be configured to provide some security measures to prevent malicious activity. In one embodiment, the switch comprises a firewall that prevents access of undesired entities.

Figure 2:
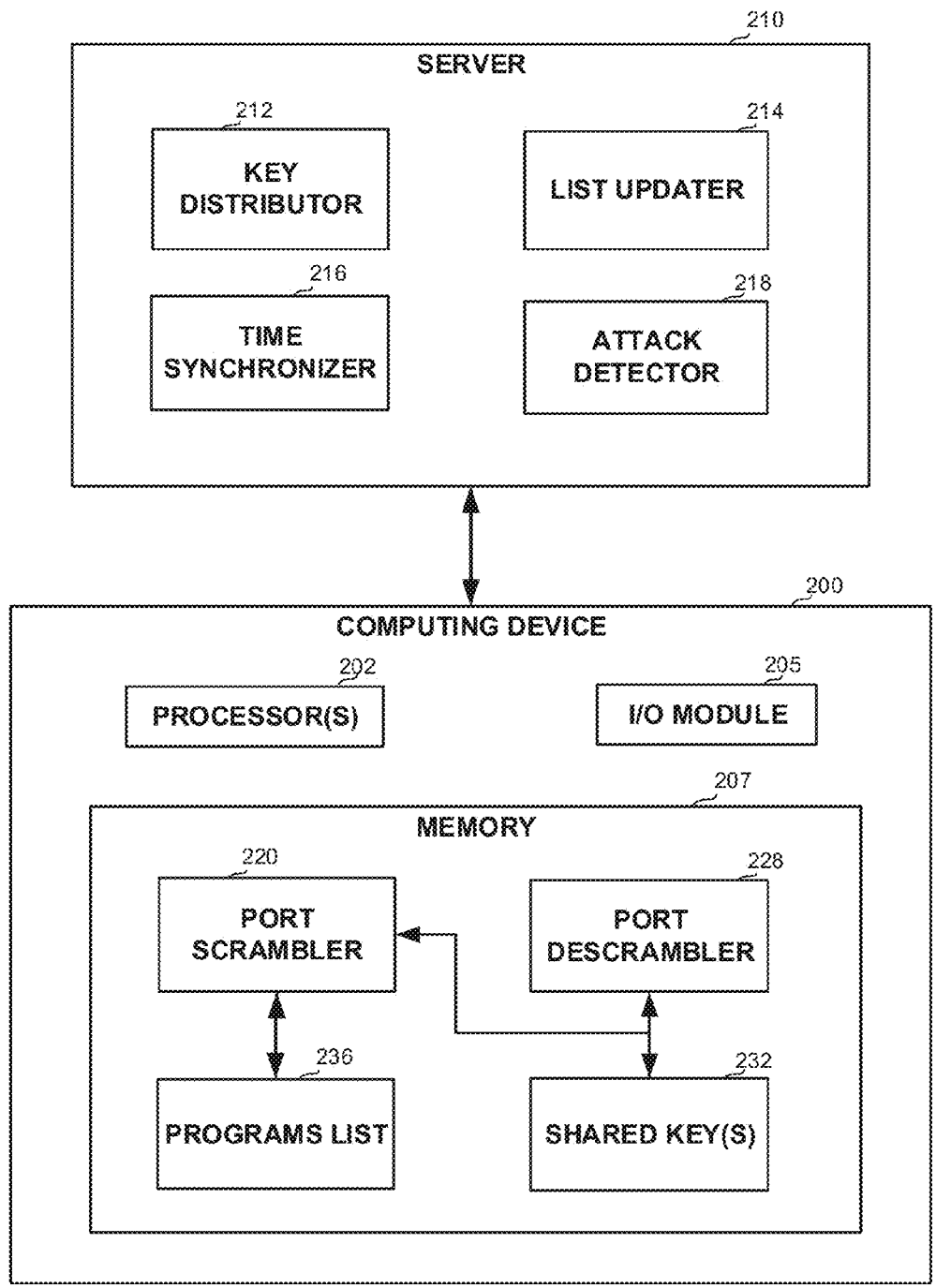
FIG. 2 shows a block diagram of a system, in accordance with some exemplary embodiments of the disclosed subject matter.

Referring now to FIG. 2 showing a block diagram of a system in accordance with some exemplary embodiments of the disclosed subject matter. The system comprises a Computing Device 200, such as Devices 110 to 150 of FIG. 1, and may be configured to provide for port scrambling, in accordance with the disclosed subject matter. In some exemplary embodiments, the system further comprises a Server 210, such as Servers 102 and 104 of FIG. 1, which may be in communication with Computing Device 200 via any suitable communication channel, such as an Ethernet switch connection or the like.

In some exemplary embodiments, Computing Device 200 may comprise one or more Processor(s) 202. Processor 202 may be a Central Processing Unit (CPU), a microprocessor, an electronic circuit, an Integrated Circuit (IC) or the like. Processor 202 may be utilized to perform computations required by Computing Device 200 or any of its subcomponents.

In some exemplary embodiments of the disclosed subject matter, Computing Device 200 may comprise an Input/Output (I/O) Module 205. The I/O Module 205 may be utilized to provide an output to and receive input from a user. Additionally or Alternatively, I/O Module 205 may be utilized to provide output to and receive input from Server 210 or another Computing Device 200 in communication therewith, such as another one of Devices 110 to 150 of FIG. 1.

In some exemplary embodiments, Computing Device 200 may comprise a Memory 207. Memory 207 may be a hard disk drive, a Flash disk, a Random Access Memory (RAM), a memory chip, or the like. In some exemplary embodiments, Memory 207 may retain program code operative to cause Processor 202 to perform acts associated with any of the subcomponents of Computing Device 200.

Memory 207 may comprise one or more components as detailed below, implemented as executables, libraries, static libraries, functions, or any other executable components.

Memory 207 may comprise Port Scrambler 220 which may comprise or be in communication with a Programs List 236 and one or more Shared Key(s) 232. Port Scrambler 220 may be configured to selectively apply a port scrambling function on port numbers associated with outgoing communications. Port Scrambler 220 may apply the port scrambling function responsive to receiving a request to transmit an outgoing communication from an application program listed on Programs List 236 (and executed by Computing Device 200). Port Scrambler 220 may use Shared Key(s) 232 as a parameter of the port scrambling function. Port Scrambler 220 may obtain a scrambled port number by applying the port scrambling function on the port number identifying the destination of the outgoing communication. Port Scrambler 220 may direct the outgoing communication to a destination identified by the scrambled port number.

Memory 207 may comprise Port Descrambler 228 which may comprise or be in communication with Shared Key(s) 232. Port Descrambler 228 may be configured to apply a port descrambling function on port numbers associated with incoming communications to Computing Device 200. The port descrambling function may be an inverse function of the port scrambling function applied by Port Scrambler 220. Port Descrambler 228 may use Shared Key(s) 232 as a parameter of the port descrambling function. Port Descrambler 228 may receive an incoming communication at a port identified by a scrambled port number. Port Descrambler 228 may obtain a descrambled port number by applying the port descrambling function on the scrambled port number. In some exemplary embodiments, Port Descrambler 228 may perform the descrambling on all incoming communications regardless of their origin. Port Descrambler 228 may redirect the incoming communication to a port identified by the descrambled port number. Port Descrambler 228 may issue a notification to Server 210 in case that the descrambled port number is not assigned to any application program currently executing on Computing Device 200.

Similarly to Computing Device 200, Server 210 may comprise Processor(s) (not shown), I/O Module (not shown) and Memory (not shown).

Server 210 may comprise a Key Distributor 212 for generating and distributing Shared Key(s) 232 among a plurality of computing devices, such as Computing Device 200, in a computer network environment such as Computer Network 100 of FIG. 1. Key Distributor 212 may distribute Shared Key 232 to Computing Device 200 using Public Key Infrastructure (PKI) cryptography. Shared Key 232 may comprise a fixed encryption key. Additionally or alternatively, Shared Key 232 may comprise a time-dependent encryption key, replaced periodically and valid for a limited time duration. In some exemplary embodiments, Shard Key(s) 232 may comprise three keys: a time dependent key that is updated periodically, a fixed key that uniquely identifies the organization in which the system of FIG. 2 is deployed, and a key which depends on Programs List 236, such as a hashing of Programs List 236.

Server 210 may comprise a List Updater 214 for maintaining and updating Programs List 236 among the plurality of computing devices in the network environment. List Updater 214 may provide credentials enabling verification of the content of Programs List 236 by Computing Device 200, for example by applying a hash function on Programs List 236 and digitally signing the result. The credentials may also be used for the scrambling or descrambling process, as one of the Shared Key(s) 232, and distributed by Key Distributor 212. In some exemplary embodiments, List Updater 214 may maintain and update a particular Programs List 236 defined for a specific computing device, or for a specific group or type of computing devices or the like comprised in the network environment. The particular Programs List 236 may be a subset of a predetermined list of authorized application programs defined for the plurality of computing devices and/or the network environment in its entirety.

Server 210 may comprise a Time Synchronizer 216 for synchronizing system clocks among the plurality of computing devices in the network environment, in case that one or more of the Shared Key(s) 232 distributed by Key Distributor 212 are time-dependent.

Server 210 may comprise an Attack Detector 218, configured for tracking and analyzing traffic in the computer network environment in order to detect possible security attacks and outbreaks. Attack Detector 218 may receive and analyze notifications from Computing Device 200 concerning incoming communications for which the descrambled port number is not assigned to an application program.

In some exemplary embodiments, Key Distributor 212, List Updater 214, Time Synchronizer 216 and Attack Detector 218 may be deployed on one or more separate servers. In one embodiment, each of the above is deployed on a stand-alone and separate server.

Figure 3A:
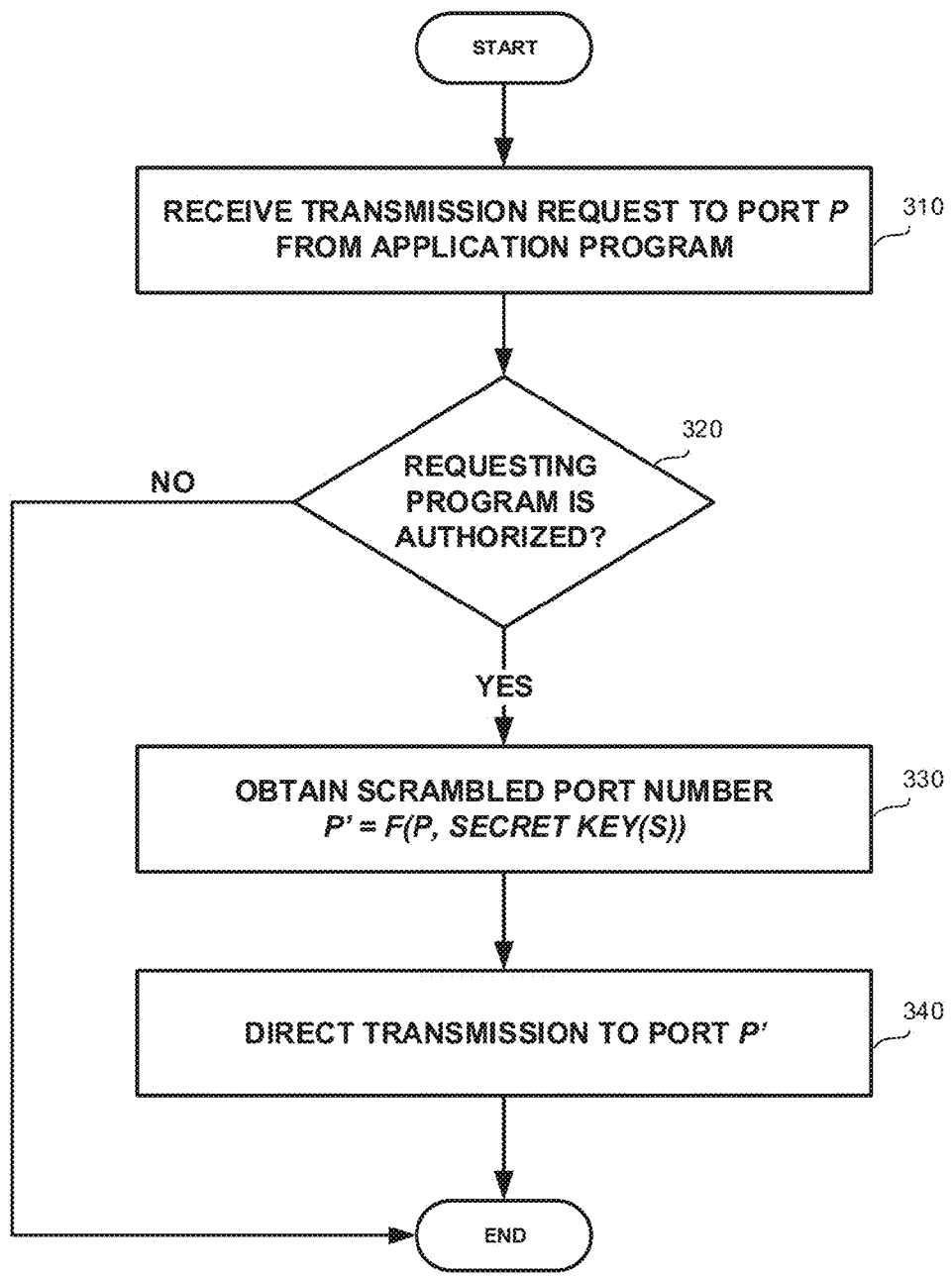
FIG. 3A shows a flowchart diagram of a method, in accordance with some exemplary embodiments of the disclosed subject matter

Referring now to FIG. 3A showing a flowchart diagram of a method in accordance with some exemplary embodiments of the disclosed subject matter.

On Step 310, a request of an application program to transmit an outgoing communication may be received. The application program may be executed by a computerized apparatus, such as Computing Device 200 of FIG. 2. The outgoing communication may be designated to be received at a destination via a first port (denoted "P"). The destination may be a destination external to the computerized apparatus, e.g. another Computing Device 200. As an example, the destination of a UDP packet may be provided as an IP address and a port (e.g., 192.168.1.52:80).

On Step 320, a determination whether the requesting application program is authorized may be made. The determination may be accomplished by consulting a list of authorized programs, such as Programs List 236 of FIG. 2. In some exemplary embodiments, non-authorized programs may still operate in the computing device, however, in view of the disclosed subject matter, such programs may not be able to effectively communicate with other devices on the same network.

On Step 330, in case that the requesting application program was determined to be authorized on Step 320, a transformation function may be applied on an identifier of the first port to obtain an identifier of a second port. The transformation function may depend on at least one secret parameter shared among a plurality of computing devices in a computer network, such as Shared Key 232 of FIG. 2. The identifier of the first port may be obtained by applying an inverse transformation on the identifier of the second port. The inverse transformation may depend on the at least one secret parameter, such that only devices sharing the at least one secret parameter may be able to apply the inverse transformation. The transformation function may be either a symmetric cryptography function, such as DES, AES, or the like, or an asymmetric cryptography function, such as RSA, El-Gammal, or the like.

In some exemplary embodiments, the scrambled port number may not be a port number which has a general known functionality, such as port numbers known as "common port numbers" which are published by the Internet Assigned Number Authority (IANA) or the like. As an example, the scrambled port may not be port 20-21 (used for FTP), port 22 (used for SSH), port 53 (used for DNS), port 80 (used for HTTP), port 443 (used for HTTPS) or the like. On Step 330, in case the transformation function provides an excluded port, a next non-excluded port may be selected. Additionally or alternatively, a list of excluded ports may include common port numbers or other port numbers which are constantly excluded. The list may also include port numbers which were used as scrambled ports in a previous time segment. For example, in case port 80 was scrambled to port 1579 during a first time segment, in a next time segment, when port 80 is scrambled to a different port number, all other ports may be excluded from being scrambled to port 1579 so as to avoid collision and confusion. In such an embodiment, a packet that is destined to port 1579 and is received in the second segment may be uniquely identified as a packet that was transmitted during the first time segment towards port 80.

On Step 340, the outgoing communication may be directed to be received at the destination via the second port. In the above given example in which the original address is 192.168.1.52:80 and in which port 80 is scrambled to port 1579, the outgoing communication may be transmitted to 192.168.1.52:1579.

In some exemplary embodiments, a content of the at least one secret parameter may be updated in each of the plurality of computing devices in the network. As a result, operation of the transformation function may be dynamically and automatically modified for all computing devices in the network. In particular, a subsequent request to transmit an outgoing communication to be received via the first port, may result in the application of the transformation function on Step 330 yielding an identifier of a third port different from the second port. In some exemplary embodiments, the transformation function is modified without a user providing a modified definition thereof.

Figure 3B:
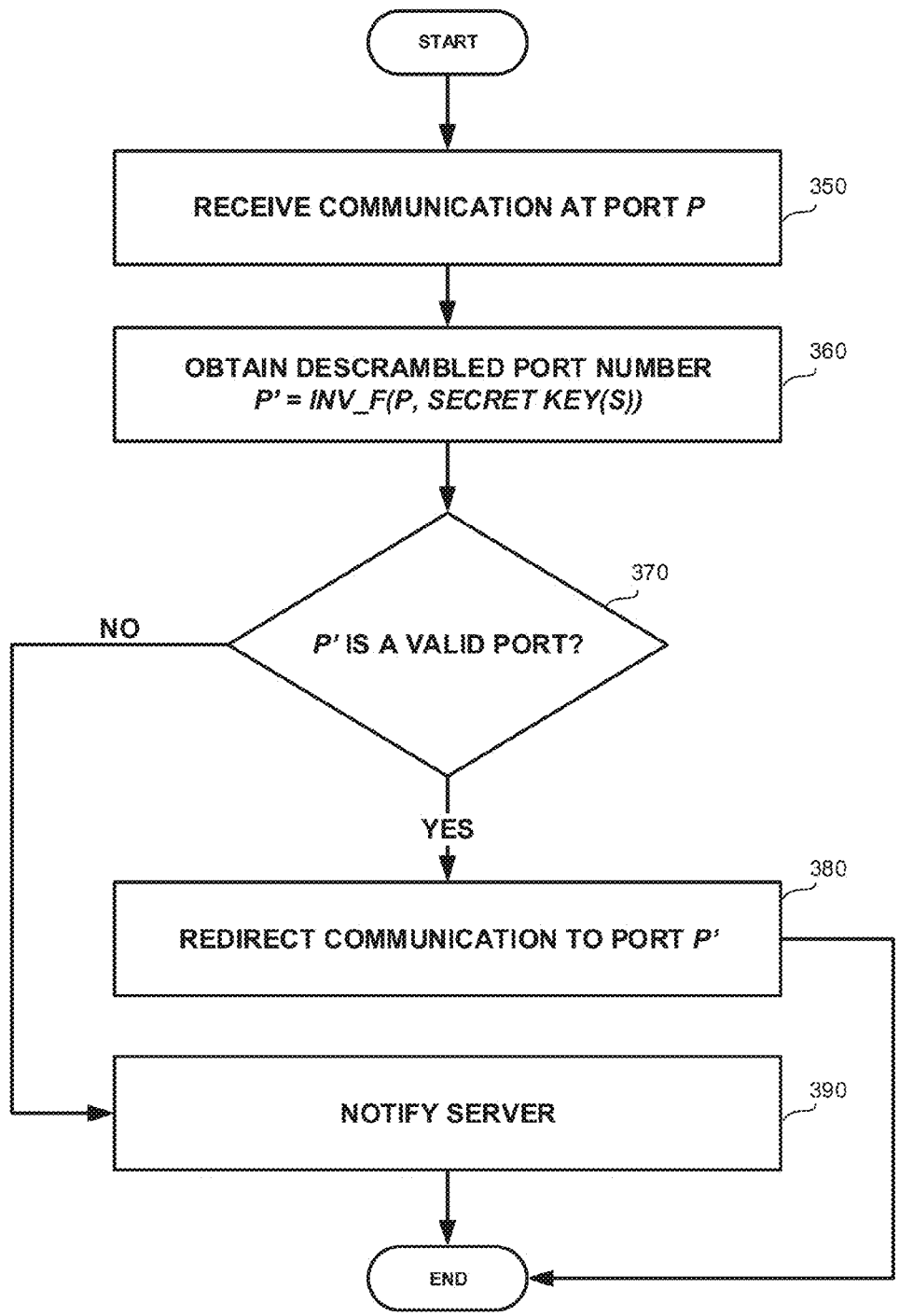
FIG. 3B shows a flowchart diagram of a method, in accordance with some exemplary embodiments of the disclosed subject matter.

Referring now to FIG. 3B showing a flowchart diagram of a method in accordance with some exemplary embodiments of the disclosed subject matter.

On Step 350, an incoming communication via a first port of a computerized apparatus, such as Computing Device 200 of FIG. 2, may be received. The incoming communication may be received from an external device via a computer network, such as Computer Network 100.

On Step 360, an identifier of a second port may be obtained by applying an inverse transformation function on an identifier of the first port. The inverse transformation function may depend on at least one secret parameter shared among a plurality of computing devices in the computer network, such as Shared Key 232 of FIG. 2.

On Step 370, a determination whether the second port is a valid port may be made. A valid port may be any port that is used by any of the programs in a list of authorized programs, such as Programs List 236 of FIG. 2. Additionally or alternatively, a valid port may be any common port. Additionally or alternatively, a valid port may be any port that is used by a program that is executed by the computerized apparatus.

On Step 380, in case that the second port was determined to be a valid port on Step 370, the incoming communication may be redirected to the second port. In some exemplary embodiments, subsequently, the incoming communication is received by a program and handled appropriately.

On Step 390, in case that the second port was determined as not being a valid port on Step 370, a corresponding notification may be issued to an entity in charge of tracking and analyzing network traffic for detecting attacks, such as Attack Detector 218 at Server 210 of FIG. 2. Additionally or alternatively, the received communication may be dropped and disregarded.

In some exemplary embodiments, a communication issued by an application that is not part of the list of authorized programs, such as Programs List 236 of FIG. 2, is not scrambled as described in FIG. 3A and thus is not received and handled by the desired final destination at the receiving device, as depicted in FIG. 3B. As a result, any non-authorized program that is executed by a device on the network is unable to effectively communicate with other devices.

In some exemplary embodiments, an unauthorized application is incapable of effectively accessing an external network to report to a malicious user. In order to communicate with a device in the external network, the device first needs to communicate with a router, bridge, switch or a similar device referred to as a router, which connects the network to the external network. Such communication may also be performed based on scrambled ports. As a result, and as the communication initiated by the unauthorized application is not scrambled, the router dismisses the communication and does not act upon it.

In some exemplary embodiments, communications in an organization's network may go through a firewall. The firewall may not be configured to handle port scrambling/descrambling. In such case, the transmitting device may determine that the packet is directly transmitted to a firewall and avoid port scrambling of such packet. Additionally or alternatively, a receiving device receiving a packet directly from a firewall, may avoid performing port descrambling on the received packet.

Figure 4:
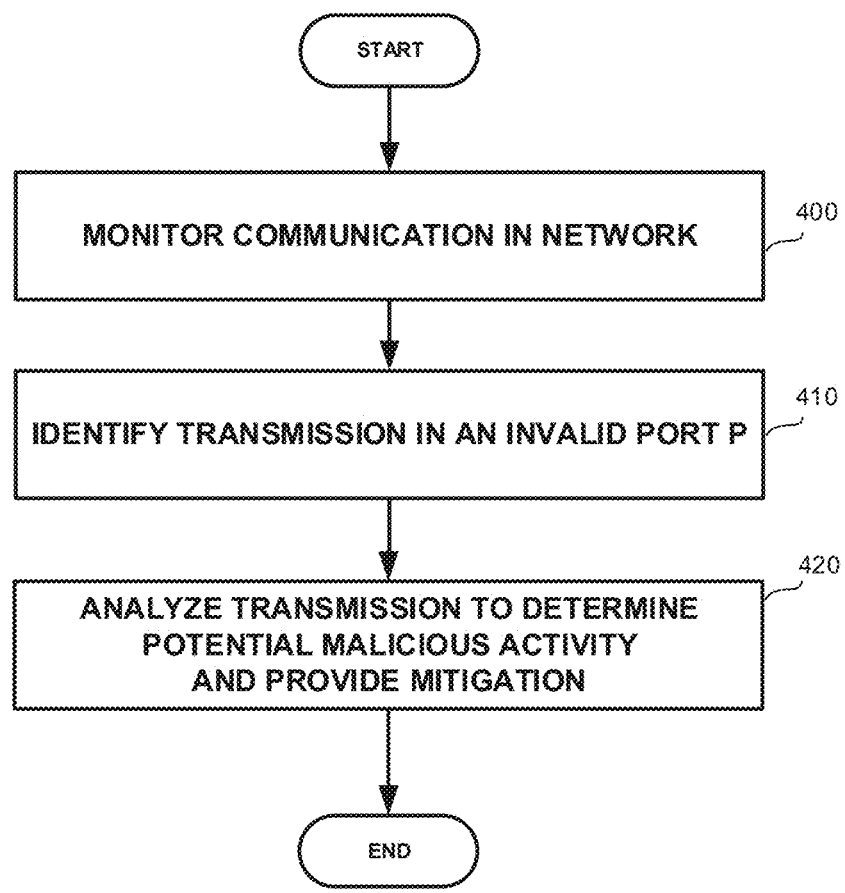
FIG. 4 shows a flowchart diagram of a method, in accordance with some exemplary embodiments of the disclosed subject matter.

Referring now to FIG. 4 showing a flowchart diagram of a method in accordance with some exemplary embodiments of the disclosed subject matter. In some exemplary embodiments, FIG. 4 may be performed by a server, such as Server 210 of FIG. 2.

On Step 400, traffic in the network may be monitored. In some exemplary embodiments, the traffic may be monitored directly by a server, such as by analyzing packets that are routed via the server. Additionally or alternatively, the traffic may be monitored using distributed agents, such as dedicated software executed by devices in the network. In one embodiment, a port scrambler is installed on each device in the network and is used as a distributed monitoring agent on behalf of the server.

On Step 410, a transmission that attempts to access an invalid port is identified. In some exemplary embodiments, transmission which is performed within a reasonable timeframe after a port was valid and became invalid, such as within 5 seconds, about 1 minute, about 10 minutes, or the like, may be overlooked as such attempt to access invalid port may be attributed to differences in clocks of different devices. In some exemplary embodiments, the target port may be compared to currently valid ports, such as defined by the transformation function.

In some exemplary embodiments, a list of predetermined ports, such as ports commonly used ports (e.g., common port numbers), may be excluded from being valid at any time. For example, port 80 may not be used as a scrambled port. Any attempt to access a port in the list may be immediately identified as an attempt, and attempt to access such predetermined known port which is invalid by definition of the transformation function, may be immediately determined to be an attempt to access an invalid port.

In some exemplary embodiments, a minority of the devices of the network, such as a firewall component, a gateway component, or the like, may not be configured to scramble and descramble ports. The analysis of Step 410 may ignore packets originating from such devices or directed towards such devices. In some exemplary embodiments, only transmission attempts directed towards devices that descramble ports for incoming packets may be analyzed and considered during Step 410.

Additionally or alternatively, on Step 410, a notification by a receiving client that the port is invalid may be received, such as depicted on Step 390 of FIG. 3B.

On Step 420, the transmission may be analyzed to determine whether it is part of malicious activity. In some exemplary embodiments, past attempts from the same device may also be used to make such determination. In some exemplary embodiments, port scanning attempts may include a repetitive attempt to access ports in order to identify open ports. Such activity may include several attempts to access ports that may be invalid. In some exemplary embodiments, a monitoring server such as Server 210 of FIG. 2 may effectively disconnect a device from which such attempts originate of the remaining devices in the network, such as, for example, by providing the device with a false, corrupted or otherwise tampered version of Shared Key(s) 232 and/or Programs List 236 from Key Distributor 212 and List Updater 214, respectively.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed in a computer network environment comprising a plurality of devices, each of which being configured for applying a transformation function on an identifier of a target port for network communication indicated in a transmission request of an application program executing thereon, whereby a scrambled version of the identifier is obtained, the plurality of devices being further configured for directing the transmission to be received via a different target port identified by the scrambled version of the identifier, the method comprising:

identifying an invalid port access attempt by a first transmission directed at a first port of a first computerized apparatus comprised in the plurality of devices; and, in response to said identifying, providing for an action to be performed whereby a security threat ascribed to the invalid port access attempt is mitigated, wherein the action comprises disconnecting the first computerized apparatus comprised in the plurality of devices from the network environment by providing the first computerized apparatus with a false, corrupted or tampered version of at least one parameter shared among the plurality of devices;

wherein said identifying the invalid port access comprises checking whether a first identifier identifying the first port is obtainable from applying the transformation function on a second identifier of a second port via which receipt is designated by a transmission request of an application program executing on a second computerized apparatus comprised in the plurality of devices;

wherein the transformation function depends on at least the one parameter shared among the plurality of devices, wherein the step of applying the transformation function by a device of the plurality of devices is conditioned on the application program requesting transmission being listed in a list of authorized application programs provided to the device.

2. The computer-implemented method of claim 1, further comprising: determining, based on analyzing the first transmission, whether the first transmission is likely to transpire from a malicious activity, wherein the action is responsive to said determining.

3. The computer-implemented method of claim 2, wherein said determining further comprises analyzing past access attempts from a same device of which the first transmission originates to identify repeated or successive attempts to access invalid or neighboring ports.

4. The computer-implemented method of claim 2, wherein analyzing the first transmission is skipped for traffic originating from or directed towards one of a predetermined collection of devices in the computer network.

5. The computer-implemented method of claim 4, wherein the predetermined collection of devices comprises one or more devices of a type selected from the group consisting of: a firewall component; a gateway component; and any combination thereof.

6. The computer-implemented method of claim 1, wherein the first transmission is intercepted by a server monitoring traffic over the computer network, wherein said identifying is performed by the server.

7. The computer-implemented method of claim 1, wherein the first transmission is intercepted by a monitoring agent deployed at the first computerized apparatus, wherein said identifying is performed by the monitoring agent.

8. The computer-implemented method of claim 1, wherein said checking comprises comparing the first identifier to a collection of valid target ports obtained by applying the transformation function on identifiers of ports each of which being of a type selected from the group consisting of: a common port; a port used by a program in the list of authorized application programs; a port used by a program executing on the first computerized apparatus; and any combination thereof.

9. The computer-implemented method of claim 1, wherein the at least one parameter comprises a time-dependent encryption key, wherein the method further comprising:
determining whether the first port was previously valid;
computing a timeframe from when the first port became invalid and until the transmission attempted accessing thereto; and
comparing the timeframe to a predetermined threshold;
wherein the action is determined based at least on whether the predetermined threshold is exceeded by the timeframe.

10. The computer-implemented method of claim 1, wherein said checking comprises comparing the first identifier to a collection of identifiers of predetermined ports excluded from being used as target ports for receiving transmissions, whereby invalidity of the first port is determined upon a match being found.

11. The computer-implemented method of claim 1, wherein the action entails preventing a device of which the first transmission originates from effectively communicating with any of the plurality of devices by providing the device with a defunct instance of at least a portion of the at least one parameter.

12. The computer-implemented method of claim 1, wherein said identifying comprises applying an inverse transformation function on the first identifier.

13. The computer-implemented method of claim 1, wherein the list of authorized application programs provided to the device is a subset of a predetermined list of authorized application programs defined for the plurality of devices.

14. A computerized apparatus having a processor, the computerized apparatus being in communication with a computer network environment comprising a plurality of devices, each of which being configured for applying a transformation function on an identifier of a target port for network communication indicated in a transmission request of an application program executing thereon, whereby a scrambled version of the identifier is obtained, the plurality of devices being further configured for directing the transmission to be received via a different target port identified by the scrambled version of the identifier, the processor being adapted to perform the steps of:
identifying an invalid port access attempt by a first transmission directed at a first port of a first computerized apparatus comprised in the plurality of devices;
and in response to said identifying, providing for an action to be performed whereby a security threat ascribed to the invalid port access attempt is mitigated, wherein the action comprises disconnecting the first computerized apparatus comprised in the plurality of devices from the network environment by providing the first computerized apparatus with a false, corrupted or tampered version of at least one parameter shared among the plurality of devices;
wherein said identifying the invalid port access comprises checking whether a first identifier identifying the first port is obtainable from applying the transformation function on a second identifier of a second port via which receipt is designated by a transmission request of an application program executing on as second computerized apparatus comprised in the plurality of devices;
wherein the transformation function depends on at least one parameter shared among the plurality of devices, wherein the step of applying the transformation function by a device of the plurality of devices is conditioned on the application program requesting transmission being listed in a list of authorized application programs provided to the device.

15. The computerized apparatus of claim 14, wherein the processor being further configured for: determining, based on analyzing the first transmission, whether the first transmission is likely to transpire from a malicious activity, wherein the action is responsive to said determining.

16. The computerized apparatus of claim 15, wherein said determining further comprises analyzing past access attempts from a same device of which the first transmission originates to identify repeated or successive attempts to access invalid or neighboring ports.

17. The computerized apparatus of claim 14, wherein analyzing the first transmission is skipped for traffic originating from or directed towards one of a predetermined collection of devices in the computer network.

18. The computerized apparatus of claim 14, wherein said checking comprises comparing the first identifier to a collection of valid target ports obtained by applying the transformation function on identifiers of ports each of which being of a type selected from the group consisting of: a common port; a port used by a program in the list of authorized application programs; a port used by a program executing on the first computerized apparatus; and any combination thereof.

19. The computerized apparatus of claim 14, wherein the at least one parameter comprises a time-dependent encryption key, wherein the processor is further configured to perform the steps of:
determining whether the first port was previously valid;
computing a timeframe from when the first port became invalid and until the transmission attempted accessing thereto; and
comparing the timeframe to a predetermined threshold;
wherein the action is determined based at least on whether the predetermined threshold is exceeded by the timeframe.

20. A computer program product comprising a non-transitory computer readable storage medium retaining program instructions, which program instructions when read by a processor, cause the processor to perform a method carried out in a computer network environment comprising a plurality of devices, each of which being configured for applying a transformation function on an identifier of a target port for network communication indicated in a transmission request of an application program executing thereon, whereby a scrambled version of the identifier is obtained, the plurality of devices being further configured for directing the transmission to be received via a different target port identified by the scrambled version of the identifier, the program instructions read by the processor performs method comprising:
identifying an invalid port access attempt by a first transmission directed at a first port of a first computerized apparatus comprised in the plurality of devices;
and in response to said identifying, providing for an action to be performed whereby a security threat ascribed to the invalid port access attempt is mitigated, wherein the action comprises disconnecting the first computerized apparatus comprised in the plurality of devices from the network environment by providing the first computerized apparatus with a false, corrupted or tampered version of at least one parameter shared among the plurality of devices;
wherein said identifying the invalid port access comprises checking whether a first identifier identifying the first port is obtainable from applying the transformation function on a second identifier of a second port via which receipt is designated by a transmission request of an application program executing on a second computerized apparatus comprised in the plurality of devices;

wherein the transformation function depends on at least one parameter shared among the plurality of devices, wherein the step of applying the transformation function by a device of the plurality of devices is conditioned on the application program requesting transmission being listed in a list of authorized application programs provided to the device.

* * * * *